United States Patent [19]
Parr et al.

[11] 3,867,912
[45] Feb. 25, 1975

[54] ROTARY ENGINE

[75] Inventors: Edward L. Parr; George T. Straza, both of El Cajon, Calif.

[73] Assignee: Straza Enterprises Ltd., El Cajon, Calif.

[22] Filed: Aug. 2, 1973

[21] Appl. No.: 384,962

[52] U.S. Cl. ............................. 123/8.41, 418/227
[51] Int. Cl. ............................................... F02b 53/00
[58] Field of Search ....... 123/8.23, 8.41, 8.19, 8.25, 123/8.29, 8.43; 418/191, 227, 225

[56] References Cited
UNITED STATES PATENTS

| | | | |
|---|---|---|---|
| 1,058,157 | 4/1913 | Curtis et al. | 418/191 |
| 1,976,761 | 10/1934 | Barels | 123/8.41 |
| 2,297,529 | 9/1942 | Berry | 418/191 |
| 2,719,513 | 10/1955 | Dezell | 123/8.23 |
| 3,251,348 | 5/1966 | Unruh | 123/8.41 |
| 3,453,992 | 7/1969 | Graham | 123/8.41 |

FOREIGN PATENTS OR APPLICATIONS 122,388   10/1946   Australia............................ 418/191

*Primary Examiner*—C. J. Husar
*Assistant Examiner*—Michael Koczo, Jr.
*Attorney, Agent, or Firm*—Brown & Martin

[57] ABSTRACT

A rotary engine having a compressor unit and a power unit of similar construction, each having a piston travelling in a toroidal chamber in synchronization with a rotary sleeve valve. The two units are coupled by common drive and valve shafts and have a valved compressed air transfer connection. Combustion is extended over a major portion of each revolution in the power unit, resulting in very complete combustion and high efficiency, low pollution operation. Volumetric capacity of the engine is large for the overall size and multiple units can be coupled to suit power requirements.

4 Claims, 8 Drawing Figures

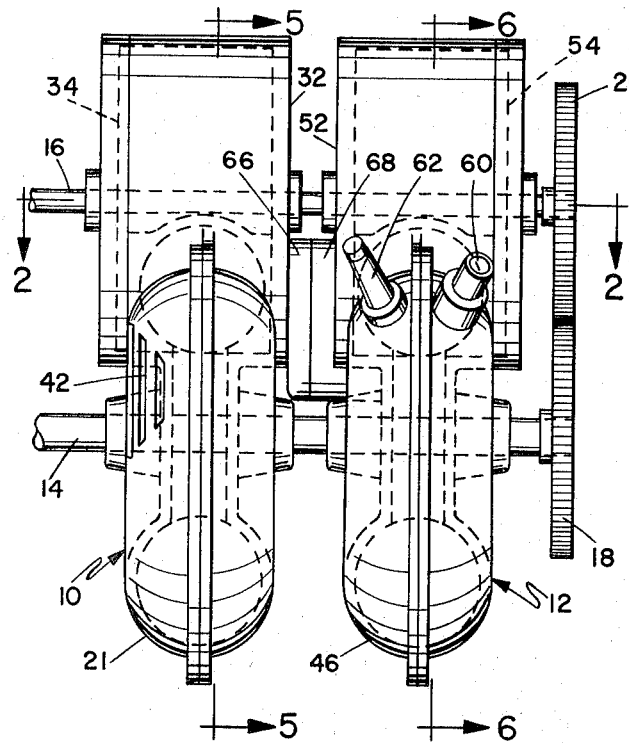
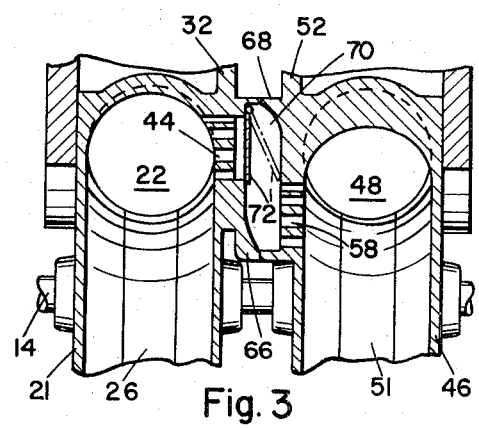
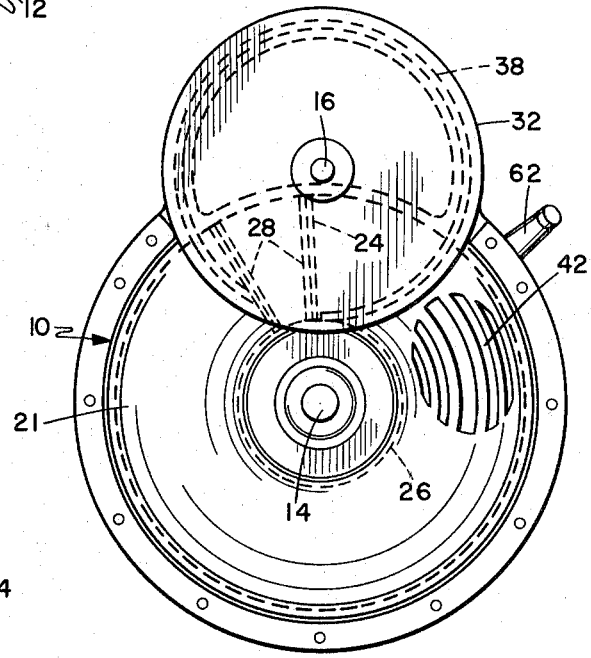
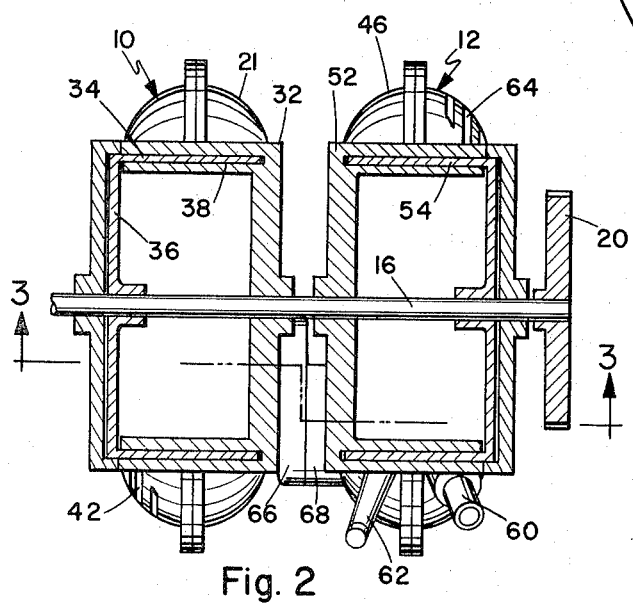
Fig. 1
Fig. 3
Fig. 4
Fig. 2

3,867,912

ROTARY ENGINE

BACKGROUND OF THE INVENTION

Rotary engines, in which vanes or pistons travel in annular or toroidal chambers, may be fully rotary or have their vanes or pistons oscillating in the chambers. In the latter, complex linkage is needed for synchronization. Many of the fully rotary type engines have valves which interfit with the vanes or pistons in complex valve and chamber configurations. Further, since all stages of the power cycle usually occur in a single annular chamber the duration of each stage, particularly the combustion, is somewhat limited.

SUMMARY OF THE INVENTION

The rotary engine described herein has a compressor unit and a power unit which are similar in size and structure, each having a single piston travelling in a toroidal chamber. Each piston is synchronized by simple gearing with a rotary sleeve valve, the two units being interconnected by common drive and valve shafts. The volumetric capacity is large for the overall size of the engine, the compressor providing a considerable volume of compressed air at each revolution. A one way valve connects the compressor unit to the intake of the power unit, at which fuel injection and ignition occur. The combustion extends over a major portion of a revolution of the power unit, resulting in very complete combustion and clean exhaust. No complex chamber configurations are necessary and there are very few parts in the engine. Multiple stages can be connected in line to meet various power requirements.

The primary object of this invention, therefore, is to provide a new and improved rotary engine.

Another object of this invention is to provide a rotary engine having separate compressor and power units with synchronized interconnection.

Another object of this invention is to provide a new and improved rotary engine in which the compression and combustion stages extend over a major portion of each revolution of the respective units.

A further object of this invention is to provide a new and improved rotary engine having a simple configuration with a minimum of parts.

Other objects and many advantages of this invention will become more apparent upon a reading of the following detailed description and an examination of the drawings wherein like reference numerals designate like parts throughout and in which:

FIG. 1 is a side elevation view of the engine.

FIG. 2 is a sectional view taken on line 2—2 of FIG. 1.

FIG. 3 is a sectional view taken on line 3—3 of FIG. 2.

FIG. 4 is an end elevation view as taken from the left hand side of FIG. 1.

DESCRIPTION OF THE PREFERRED EMBODIMENT

Figure 5:
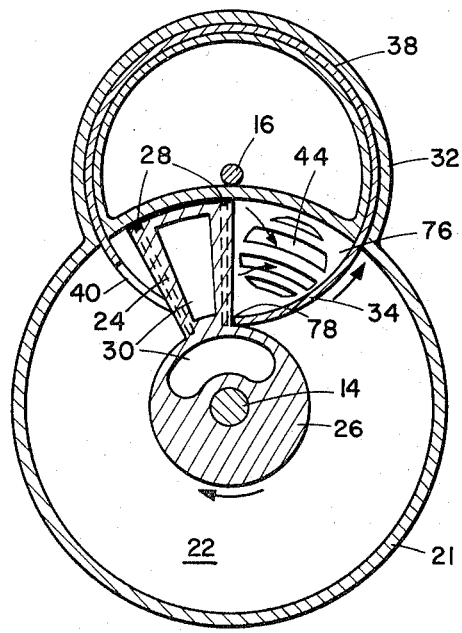
FIG. 5 is a sectional view taken on line 5—5 of FIG. 1.

The engine comprises a compressor unit 10 and a power unit 12 of similar size and configuration, the two being connected by a common drive shaft 14 and a common valve shaft 16. Gears 18 and 20 of equal size are fixed to shafts 14 and 16, respectively, to synchronize the two shafts for equal and opposite rotation.

Compressor unit 10 has a housing 21 with a toroidal compressor chamber 22 coaxial with shaft 14 and containing a piston 24, which is fixed on a disc 26 carried on the shaft 14. Disc 26 has a diameter equal to and forms the inner portion of toroidal chamber 22. By using a piston of circular cross section in a toroidal chamber, conventional type piston rings 28 can be used for sealing. The piston 24 and the adjacent portion of disc 26 may be hollow, as indicated at 30, to balance the rotating assembly. Integral with and intersecting housing 21 is a cylindrical valve housing 32, in which is a cylindrical sleeve valve 34. The valve has an end plate 36 fixed to shaft 16 and rotates in a close fitting annular channel 38. Valve 34 projects into compression chamber 22 and makes tangential rolling contact with disc 26 to block the toroidal chamber, the valve having an opening 40 through which piston 24 can pass in synchronized rotation. Shafts 14 and 16 are parallel and rotate in suitable bearings in their respective housings.

As viewed in FIGS. 4 and 5, the piston 24 rotates in a clockwise direction and sleeve valve 34 rotates counterclockwise. Housing 21 has an air intake 42 immediately after the valve position in the direction of piston rotation. The intake is illustrated as being circumferentially slotted to avoid binding of the piston, but other opening configurations may be used. Housing 21 also has an air outlet 44 on the side toward power unit 12 and in the portion of the toroidal chamber enclosed by the sleeve valve 34, as in FIG. 5.

Power unit 12 has a housing 46 with a toroidal power chamber 48, in which is a piston 50 on a disc 51 fixed to shaft 14. A valve housing 52, integral with housing 46, contains a cylindrical sleeve valve 54 which extends into chamber 48 in tangential contact with disc 52, as in FIG. 6. Valve 54 has an opening 56 for passage of piston 50, the structure being similar to the compressor unit. Housing 46 has an inlet 58 on the side adjacent compressor unit 10 and immediately after the sleeve valve in the direction of piston rotation. At the inlet position is a fuel injector 60 and, if needed, ignition means 62 such as a spark or glow plug. Housing 46 has an exhaust outlet 64 immediately preceding valve 54 in the direction of piston rotation.

Housing 21 has an extension 66 and housing 46 has a connecting extension 68, enclosing a transfer passage 70 between air outlet 44 and inlet 58, as in FIG. 3. At the air outlet 44 is a one way valve 72 which prevents blowback from the power unit. A simple flap valve is illustrated, but any suitable type may be used.

The housings may be split and secured in any convenient manner to facilitate manufacture and assembly. Mounting lugs or brackets may be used where necessary to suit specific installation.

Figure 6:
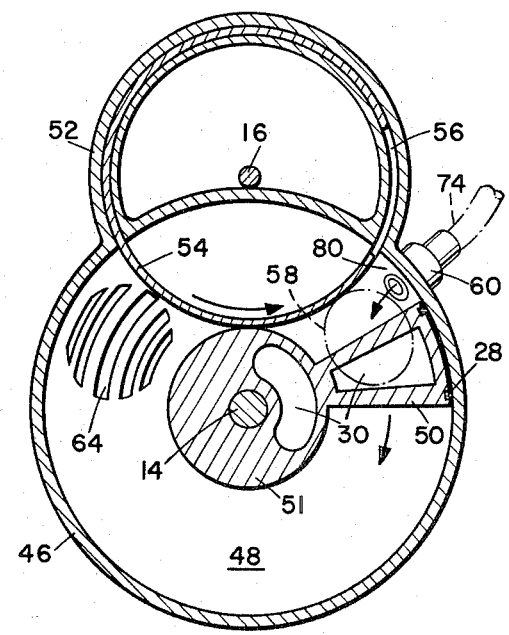
FIG. 6 is a sectional view taken on line 6—6 of FIG. 1.
Figure 7:
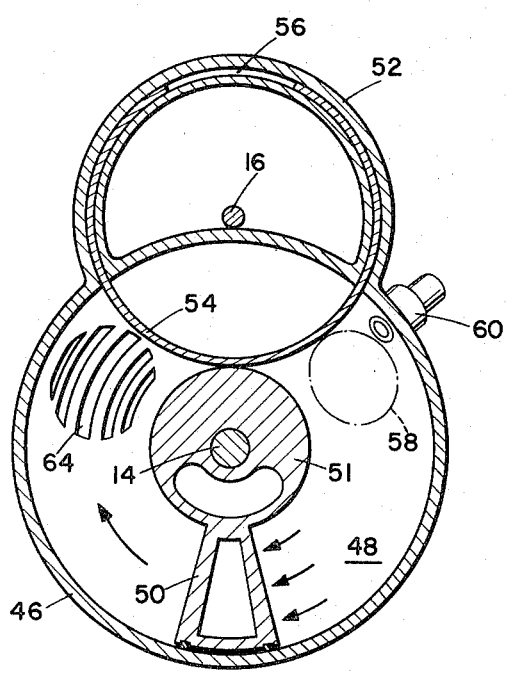
FIGS. 7 and 8 are views similar to FIG. 6, but at successive positions in the combustion stage.
Figure 8:
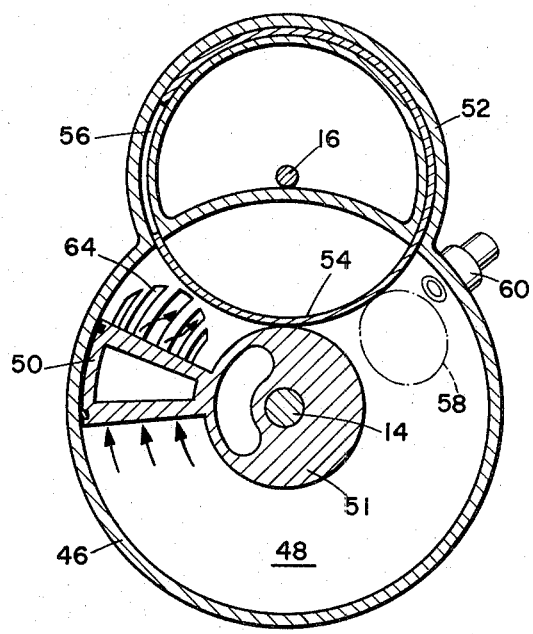

In operation, a fuel supply line 74 is connected to injector 60, as indicated in broken line in FIG. 6. Depending on the type of fuel used and the compression ratio, the ignition means 62 may or may not be required. If used, any conventional ignition power supply and timing means may be used.

Air intake 42 is always open, so the compression chamber 22 fills with air behind the rotating piston 24. Ahead of the piston the air is compressed against sleeve valve 34, which is closed except when interfitting with the piston. As the piston 24 approaches sleeve valve 34 and passes through opening 40, as in FIG. 5, the compressed air is trapped in the cavity 76 between the piston and valve and forced out through outlet 44. Piston 24 maintains a seal with the leading edge 78 of opening 40, as the piston passes through the valve. Continued motion of the piston closes outlet 44, the valve 34 closes as the piston becomes disengaged, and the compression action repeats.

The compressed air charge opens valve 72 and enters the power chamber 48 through inlet 58. The pistons are secured to shaft 14 so that the power piston 50 leads the compressor piston 24, the relative simultaneous positions being illustrated in FIGS. 5 and 6. The compressed air thus enters the small combustion cavity 80 between the closed valve 54 and piston 50, and fuel is injected and ignited. Combustion continues for approximately 270° of rotation, until piston 50 passes the exhaust outlet 64 and allows the combustion gases to escape. Piston 50 passes through sleeve valve 54, as in the compressor unit, the sleeve valve in the power unit acting as a seal between the combustion and exhaust zones.

The prolonged combustion phase results in very complete burning of the fuel and air mixture and provides a useful power application for a large portion of each revolution. By coupling multiple paired units with the pistons out of phase in successive pairs to overlap the power phases, a smooth continuous power output is obtained. A multiple unit engine is easily assembled on common shafts to suit any power requirements.

Having described our invention, we now claim:

1. A rotary engine comprising,
   a compressor unit and a power unit;
   said compressor unit having a housing with a toroidal compression chamber, and a piston rotatable in the compression chamber;
   said power unit having a housing with a toroidal power chamber, and a piston rotatable in the power chamber;
   a common drive shaft connecting said pistons and being axially rotatably mounted in said housings;
   said units each having a substantially cylindrical rotary sleeve valve with an opening to receive the respective piston, each sleeve valve intersecting and extending across the respective toroidal chamber and being synchronized with the pistons therein to seal with the piston passing through the opening;
   said sleeve valves having a common axial shaft parallel to said drive shaft;
   said compressor unit having an air intake opening into the compression chamber immediately after the sleeve valve in the direction of rotation, and an air outlet opening out of the compression chamber in the portion thereof enclosed by the sleeve valve;
   said power unit having an inlet and an exhaust outlet;
   a transfer passage connecting said air outlet to said power unit inlet;
   and said power unit having fuel injection and ignition means adjacent said inlet.

2. A rotary engine according to claim 1, wherein said power unit inlet opens into said power chamber immediately after the sleeve valve in the direction of piston rotation, and said exhaust outlet opens out of the power chamber before the sleeve valve in the direction of piston rotation.

3. A rotary engine according to claim 2, wherein said power piston leads said compressor piston to open the power unit inlet as the compressor piston reaches the air outlet.

4. A rotary engine according to claim 3, and including a one-way valve in said transfer passage for admitting compressed air from the compressor unit to the power unit.

* * * * *